United States Patent [19]

Dewey

[11] Patent Number: 4,545,270
[45] Date of Patent: Oct. 8, 1985

[54] DEVICE FOR ASSURING PREDETERMINED JOINT LOADING IN ROOF INSULATION ASSEMBLIES

[75] Inventor: George G. Dewey, Prospect Heights, Ill.

[73] Assignee: Illinois Tool Works Inc., Chicago, Ill.

[21] Appl. No.: 605,512

[22] Filed: Apr. 30, 1984

Related U.S. Application Data

[63] Continuation of Ser. No. 261,321, May 7, 1981, abandoned.

[51] Int. Cl.[4] .................. B25B 23/00; E04B 1/62
[52] U.S. Cl. .................................. 81/429; 411/371; 411/542; 411/544; 52/512
[58] Field of Search .................. 411/1, 5, 6, 7, 9–11, 411/155, 156, 371, 404, 531, 534, 535, 536, 542, 544, 545, 908, 907; 405/259, 260; 52/506, 509, 512, 410; 81/429, 451, 460

[56] References Cited

U.S. PATENT DOCUMENTS

| D. 236,428 | 8/1975 | Stewart et al. | D8/382 |
|---|---|---|---|
| 441,224 | 11/1890 | Wotton . | |
| 888,982 | 5/1908 | Ette . | |
| 1,344,417 | 6/1920 | Lovekin . | |
| 1,547,162 | 7/1925 | Bohlman . | |
| 1,679,620 | 8/1928 | Moore . | |
| 2,089,924 | 6/1935 | Legge et al. . | |
| 2,943,528 | 7/1960 | Curry . | |
| 3,212,387 | 10/1965 | Madansky | 411/371 |
| 3,321,221 | 5/1967 | Harris et al. . | |
| 3,476,010 | 11/1969 | Markey | 411/9 |
| 3,628,584 | 12/1971 | Gutshall | 411/155 |
| 3,910,588 | 10/1975 | Austin | 411/542 |
| 4,030,383 | 6/1977 | Wagner | 81/429 |
| 4,287,923 | 9/1981 | Hornung | 81/429 |
| 4,361,997 | 12/1982 | De Caro | 411/542 |
| 4,455,804 | 6/1984 | Francovitch | 52/410 |
| 4,467,581 | 8/1984 | Francovitch | 52/512 |

FOREIGN PATENT DOCUMENTS 866922  5/1961  United Kingdom ............... 411/542

Primary Examiner—Kenneth J. Dorner
Assistant Examiner—Neill Wilson
Attorney, Agent, or Firm—T. W. Buckman; David I. Roche

[57] ABSTRACT

A fastener assembly for attaching roofing insulation to roof decks. A washer with a broad load-distributing flange has a crushable region which is deformed as the fastener becomes fully seated. This region insures that the joint is loaded with a predetermined force before the depth-sensitive driver disengages reducing the likelihood of overdriving or underdriving.

13 Claims, 6 Drawing Figures

DEVICE FOR ASSURING PREDETERMINED JOINT LOADING IN ROOF INSULATION ASSEMBLIES

This application is a continuation of application Ser. No. 261,321, filed May 7, 1981, now abandoned.

BACKGROUND AND SUMMARY OF THE INVENTION

This application is related to U.S. Pat. No. 4,380,413 issued Apr. 19, 1983. The present invention is directed to a roofing insulation fastener assembly.

The fastening of compressible insulations to metal or concrete roof decks has required new fastening techniques, one of which is depicted in the abovenoted. With some washer configurations, a problem can arise in seating the fastener. Typically, power driven screwdrivers are used to install these fastener assemblies. Many of these screwdrivers have clutches or other drive engaging means which rely on axial displacement of the fastener head to disengage the drive. If the washer has a planar configuration, there is little movement of the head during seating. This can result in the assembly being left loose. If the clutch is adjusted for deeper drive, an over-drive situation can develop in which the insulation is compressed beyond its elastic limit.

The present invention provides a solution to this problem. A crushable region of the washer adjacent the fastener receiving aperture insures that a proper pre-loading of the joint occurs prior to drive disengagement. This provides a larger margin for error in adjustment of the clutch settings and reduces the chances of underdriving and overdriving.

Other features, characteristics and advantages of the present invention will become apparent after a reading of the following specification taken in conjunction with the appended drawings.

DETAILED DESCRIPTION OF THE PREFERRED EMBODIMENTS

Figure 1:
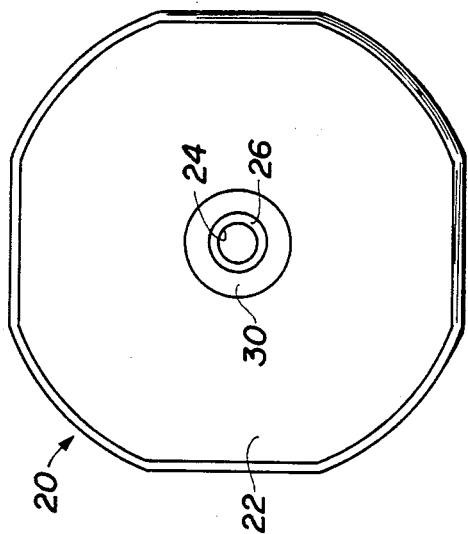
FIG. 1 is a side elevational view in partial cross section of the fastener assembly of the present invention.

The fastener assembly of the present invention is shown generally at 10. The assembly 10 comprises a fastener 12 having a head 14 with a first predetermined lateral dimension at one end with drive surfaces thereon, in the case depicted, formed as an internal drive recess 16. A threaded shank 18 extends from the head and has a second lesser predetermined lateral dimension. Depending on the application, the thread may be of the self-tapping variety and the tip may have a drill point 19 to enable the fastener to penetrate a variety of materials.

The second element of the assembly 10 is washer 20 which is preferably made of a plastic or elastomeric material. Washer 20 has a broad load-distributing flange 22 and a centrally located aperture 24. The aperture defines a third predetermined lateral dimension which is less than the first but greater than the second predetermined dimension. The upper surface of the flange may be provided with a recess 26 of sufficient size to accommodate the head 14 of fastener 12. A crushable portion 28 is provided adjacent the aperture 24 for purposes which will be detailed hereafter. The upper surface of the flange 22 may be provided with a locater ring 30 to facilitate positioning of a conventional nosepiece 31 from a power screwdriver (not shown).

In FIG. 1, fastener assembly 10 is depicted in a partially installed position which, but for the features of the present invention, could exist after installation. Roofing insulation board 33 is shown as being warped with steel girt 35 positioned therebeneath. As can be appreciated, without crushable portion 28, there would be little relative change in position between head 16 of fastener 12 and flange 22 of the washer. Since many screwguns rely on such an axial displacement in order to disengage the drive through a clutch or the like, lack of such movement creates a problem. No setting of the depth gauge will be correct for successive applications resulting in a high percentage of underdriven and overdriven fasteners.

Figure 2:
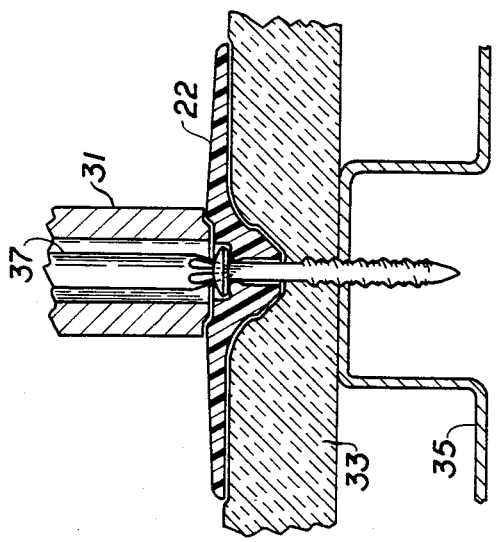
FIG. 2 is a side elevational view in partial section of the assembly in fully seated position.

As depicted in FIG. 2, the insulation board 33 is drawn up against girt 35 before the pre-load of crushable region 28 is overcome and the head reaches its fully seated position. Of course the amount of pre-load can be varied for each board application by varying the height and diameter of the crushable region. As viewed in FIG. 2, drive to the driver bit 37 has been disengaged or the bit withdrawn from recess 16, depending on the type of drive employed, as the fastener assembly is fully seated. An additional benefit is that the material from the crushable region collapses toward the shank 18 providing a seal as well as prevailing torque for the fastener. This assembly insures that a certain preloading of the joint occurs before the drive is disengaged. Further, it provides a range of acceptable depth settings for the power screwdriver when no particular setting would have been appropriate before.

Figure 4:
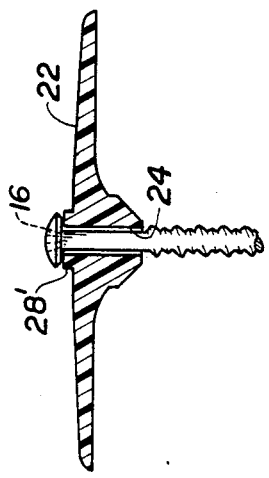
FIG. 4 is a cross-sectional side view of an alternate form of the washer of the present assembly.

FIG. 4 show an alternative embodiment of the washer 20 usable in the assembly of the present invention. The crushable region is formed as a cylindrical boss 28' which can again be varied to fit the application. Whether the crushable region takes the form of a cylindrical boss or the fillet of the previous embodiment depends largely on the nature of the material of the washer and the desired crush resistance to establish the preload.

Figure 6:
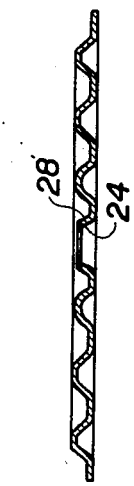
FIG. 6 is a cross-sectional view of the washer shown in FIG. 5 taken along line 6—6.
Figure 5:
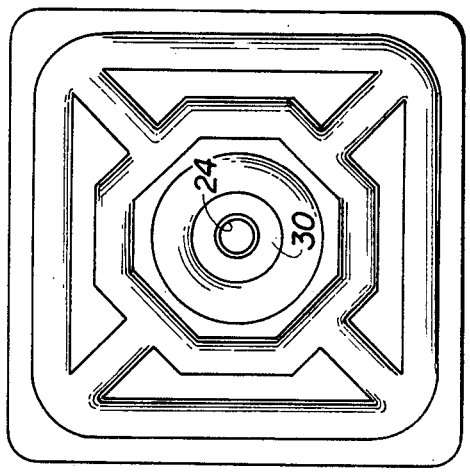
FIG. 5 is a top elevational view of a metal washer employing the teachings of the present invention.
Figure 3:
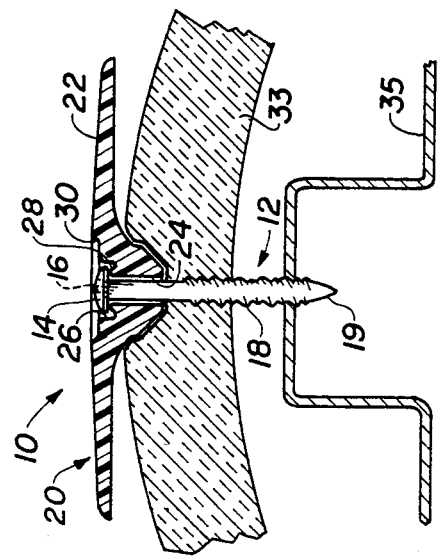
FIG. 3 is a top elevational view of one configuration of the washer of the present assembly.

FIGS. 5 and 6 depict the principles of the invention utilized with a low profile metallic washer. With such a low profile, there would be virtually no relative axial movement without the crushable zone 28.

Although the fastener assembly has been depicted as being used with roofing insulation, it will be appreciated that this invention may be used with any compressible material where similar problems might arise.

Various changes, modifications and alternatives will become apparent following a reading of the foregoing specification. Accordingly, it is intended that all such changes, modifications and alternatives as come within the scope of the appended claims be considered part of the present invention.

I claim:

1. In combination with a fastener driving tool with a bit housed within a tubular nosepiece and travel of said bit relative to said nosepiece is limited, and a threaded fastener having an elongated shank with a head at one end driven by said tool, means for causing disengagement of said fastener from said tool comprising a washer having a broad load-distributing flange with a generally flat upper surface a pair of recesses in said upper surface, a first of said pair of recesses being larger than a second of said pair of recesses, said first recess being adapted to matingly locate said tubular nosepiece, said second recess being adapted to house the head of said fastener, a centrally located aperture smaller than said head, an axially extending boss adjacent said aperture, said boss being an intergral part of said washer, said boss being shaped to collapse a predetermined axial distance upon exertion of a predetermined tensile load in said fastener, said predetermined axial distance being sufficient to cause disengagement between said fastener and said tool.

2. A combination according to claim 1 wherein said tool comprises a bit housed within a tubular nosepiece and travel of said bit relative to said nosepiece is limited, said washer having a pair of recesses in said upper surface, a first of said pair of recesses being larger than a second of said pair of recesses, said first recess being adapted to matingly locate said tubular nosepiece, said second recess being adapted to house the head of said fastener.

3. A combination according to claim 1 wherein said boss is located within a centrally located recess in said flange, whereby the head of said fastener is able to be seated beneath said upper surface of said flange.

4. A combination according to claim 1 wherein said boss is filleted and has a radial extent generally less than the radial extent of the head of said fastener.

5. A combination according to claim 1 wherein said boss slopes inwardly toward said aperture to facilitate formation of a seal around said shank upon axial compression of said boss by said head.

6. A plastic roofing washer for use with a screw having a shank and a heat at one end and a driving tool having a driving bit housed within a tubular nosepiece, said washer comprising a broad load-distributing flange, a centrally located aperture extending through said washer, said flange having a plurality of concentric recesses formed about said aperture in an upper surface of said washer, a first of said plurality of recesses providing locating means for positioning said tubular nosepiece, a second of said recesses providing means for receiving the head of said screw, said first recess having a radial extent greater than said second recess, an integrally formed locally deformable axially extending boss disposed within said second recess, said boss providing means for allowing disengagement of said head from said driving bit, and means for providing a seal around said shank upon axial compression of said boss by said head.

7. A washer according to claim 6 wherein said boss is filleted.

8. A washer according to claim 6 wherein said boss has a radial extent generally less than the radial extent of said screw head.

9. A washer according to claim 6 wherein said boss slopes inwardly toward said aperture to facilitate formation of said seal.

10. A plastic roofing washer for use with a screw having a shank and a head at one end and a driving tool having a driving bit housed within a tubular nosepiece, said washer comprising a broad load-distributing flange, a centrally located aperture extending through said washer, said flange having a plurality of concentric recesses formed about said aperture in an upper surface of said washer, a first of said plurality of recesses providing locating means for positioning a nosepiece, a second of said recesses providing means for receiving the head of a screw, said first recess having a radial extent greater than said second recess, an integrally formed locally deformable axially extending boss disposed within said second recess, said boss providing means for allowing disengagement of said head from a bit, and means for providing a seal around said shank upon axial compression of said boss by said head.

11. A washer according to claim 10 wherein said boss is filleted.

12. A washer according to claim 10 wherein said boss has a radial extent generally less than the radial extent of said screw head.

13. A washer according to claim 10 wherein said boss slopes inwardly toward said aperture to facilitate formation of said seal.

* * * * *